INVENTOR.
George F. Ritter, Jr.
BY
Nobbe & Swope
ATTORNEYS

United States Patent Office 3,361,552
Patented Jan. 2, 1968

3,361,552
METHOD AND APPARATUS FOR BENDING HORIZONTALLY CONVEYED GLASS SHEETS BETWEEN OPPOSED SHAPING MOLDS
George F. Ritter, Jr., Toledo, Ohio, assignor to Libbey-Owens-Ford Glass Company, Toledo, Ohio, a corporation of Ohio
Filed Oct. 16, 1963, Ser. No. 316,733
4 Claims. (Cl. 65—106)

This invention relates generally to the production of curved gass sheets and more particularly to a new and improved method and apparatus for bending glass sheets.

In recent years, curved sheets of glass have been rather widely used as glazing closures particularly in windows for vehicles such as automobiles or the like. When used for this purpose, a sheet must be bent to rather precise curvatures defined by the size and shape of the opening in which it is to be mounted and by the over-all styling of the vehicle. Moreover, those surfaces of the sheet lying within the viewing area of the window must be free from mars or defects which would tend to interfere with clear vision through the window.

Curved glass sheets intended for use as vehicle windows are commonly tempered to increase their resistance to damage due to impact and to improve the breaking characteristics of the glass whereby, when broken, the tempered sheets will disintegrate, as it were, into relatively small, harmless particles as opposed to the rather large, jagged pieces resulting when ordinary, untempered glass is broken.

In general, the commercial production of curved, tempered sheets of glass is accomplished by heating substantially flat sheets of glass to an elevated temperature at which the glass softens and may be bent or formed to the desired curvature, followed by chilling the sheets to rapidly reduce their temperature to a point below the annealing range of glass.

The primary object of the present invention is to provide a fast and efficient procedure for producing curved sheets of the above character on a commercial or mass production basis without adversely affecting the quality of the finished sheets.

Another object is to provide an improved apparatus for pressing heated sheets of glass to desired curvatures with a minimum of marring of the surfaces of the sheets.

Other objects and advantages of the invention will become more apparent during the course of the following description when taken in connection with the accompanying drawings.

In the drawings, wherein like numerals are employed to designate like parts throughout the same:

Figure 1:
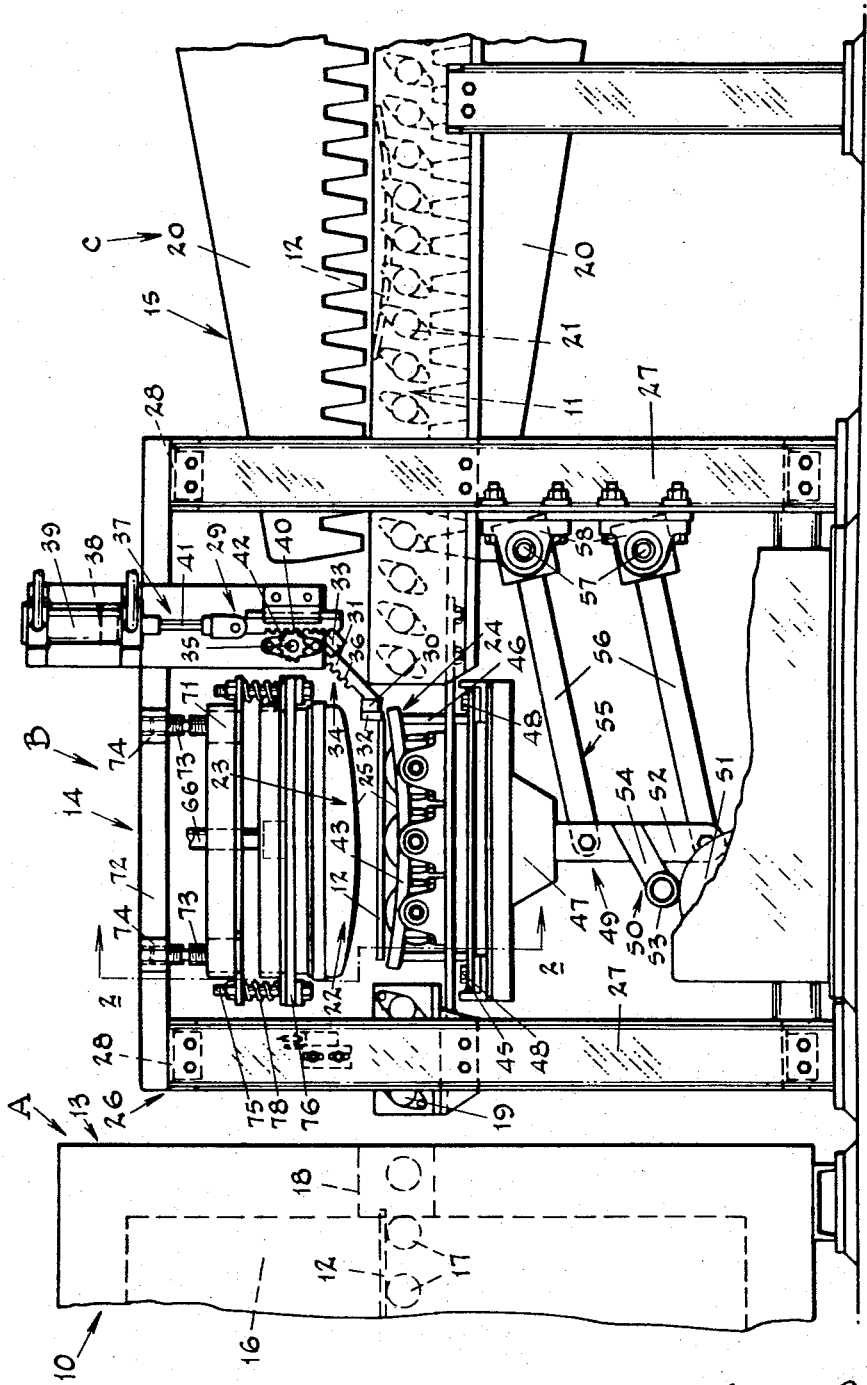
FIG. 1 is a side elevational view of a bending apparatus embodying the novel features of the present invention.
Figure 2:
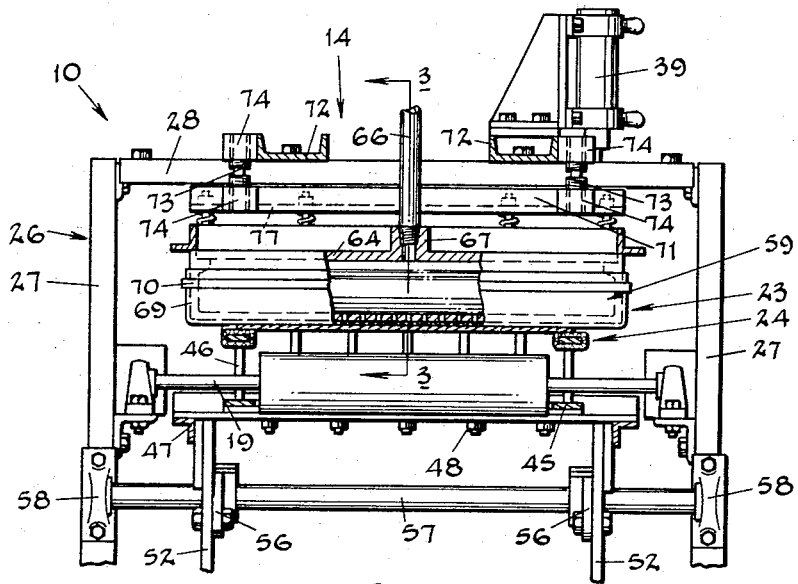
FIG. 2 is a fragmentary sectional view taken along line 2—2 in FIG. 1 with parts broken away and shown in section.

In the production of bent and tempered glass sheets in relatively large quantities, such as would be encountered in the commercial production of glazing closures for automobiles or the like, the sheets are heated, bent and tempered in a substantially continuous procedure. Usually, the sheets of glass are moved successively, one by one, along a path through a heating area, a bending area and finally a chilling or tempering area, which areas are contiguous so that an individual sheet upon being moved through one area passes immediately into and through the following area. The heat imparted to the sheet to bring it to the proper bending temperature is utilized in the tempering process.

For purpose of illustration, the novel features of the present invention are shown in the drawings incorporated in bending and tempering apparatus 10 of a type particularly adapted for use in the production of bent and tempered sheets of glass by a continuous process similar to that described above. Broadly stated, this apparatus 10 includes a conveyor system 11 operable to carry glass sheets 12 along a definite, pedetermined path through a heating area A having a furnace 13 for heating the glass sheets to the desired temperature, a bending area B having bending means 14 for shaping the sheets to the desired curvature, and a tempering area C having cooling means 15 for rapidly reducing the temperature of the sheets to produce the desired temper in the sheets. To facilitate the detailed description to follow, the position and location of the various elements making up the bending and tempering apparatus will be related to the predetermined path defined by the conveyor system and hereinafter all reference to the path shall be understood to refer to the path of movement of the sheets through the apparatus.

The furnace 13 utilized in the present instance to bring the sheets to the proper bending temperature is of the so-called tunnel-type and comprises an elongated heating chamber 16 defined by walls constructed of a suitable refractory and heated by burners or equivalent heating devices (not shown). The sheets 12 are moved through the chamber 16 on a roller-type conveyor 17 which forms a part of the conveyor system 11 and extends from an entrance end (not shown) to an oppositely disposed exit end of the furnace where the heated sheets pass through an opening 18 in the furnace wall and into the bending area B.

As the heated glass sheets are moved out of the furnace 13 and into the bending area B, they are received on a second roller conveyor 19, which is also part of the conveyor system 11, and moved past the bending means 14 which forms the heated sheets to the desired curvature.

After being bent, the sheets 12 are advanced into the cooling area C where their temperature is reduced by the cooling means 15 at a rapid rate to temper the glass. Herein the cooling means 15 comprises so-called blast heads 20 disposed above and below the path and operable to direct opposed streams of cooling fluid such as air or the like toward the path and against the opposite surfaces of the sheets moving therealong. The sheets are carried along the path between the blast heads 20 on a third conveyor 21 arranged in end-to-end alignment with the conveyors 17 and 19 to complete the conveyor system 11.

In general, the bending means 14 includes a shaping mold 22 having male and female mold parts 23 and 24 adapted to press the heated glass sheets into the desired configuration. For this purpose, complemental interfitting shaping surfaces 25, conforming in curvature to the sheets when bent, are formed on the opposed faces of the mold parts 23 and 24 which are movable relative to each other and to the path to bring the shaping surfaces into pressing engagement with the opposite sides of the heated sheets.

The bending means 14 is carried by a suitable supporting framework 26 which includes two substantially vertical columns 27 disposed at each side of the path and spaced apart longitudinally along the path with the columns on opposite sides of the path being transversely aligned. The columns 27 extend upwardly above the conveyor 19 and are tied together at their upper ends by horizontally disposed beams 28 extending transversely across the path and secured at their opposite ends to the aligned columns to form a rigid box-like structure.

In operation, a heated sheet 12, emerging from the furnace 13, is moved along the predetermined path into the bending area B and between the mold parts 23 and 24 by the conveyor 19. In response to a signal emanating from a device (not shown) sensing the movement of the sheet along the path, which device may be a photoelectric cell or the like, a bending sequence is initiated wherein the sheet is stopped momentarily between the mold parts 23 and 24, positioned relative to the shaping surfaces 25 by a locating device 29, pressed between the shaping surfaces of the mold, and then carried along the path and between the blast heads 20.

To insure that a heated sheet, upon moving into the bending area B and between the mold parts 23 and 24, is properly positioned relative to the mold parts, the locating device 29 includes a stop member 30 disposed in the plane of the path to engage the leading end of the sheet moving therealong and halt its progress when it is positioned in proper registry with the shaping surfaces 25 of the mold 22. After the sheet is properly positioned and the bending cycle of the lower mold part 24 is initiated, the stop member 30 is retracted to an out-of-the-way position where it remains until the bending cycle is completed and the bent sheet is moved out of the bending area B and into the chilling area C after which the stop member is moved back into position to engage and thereby locate a succeeding sheet in proper position to be bent.

In the illustrated embodiment, the stop member 30 includes an arm 31 having an abutment surface 32 formed thereon. The arm 31 is slidable in a guideway 33 carried by the framework 26 toward and away from the path. Sliding of the arm 31 in the guideway 33 is effected by an actuating means 34 operable to impart linear axial movement to the arms. Herein, the actuating means 34 comprises a simple pinion and rack arrangement including a pinion gear (not shown) fast on a shaft 35 journaled on the framework 26 and meshing with a rack segment 36 formed on the arm 31 whereby rotation of the shaft 35 in opposite directions rolls the pinion along the rack segment to slide the arm along the guideway toward and away from the path. Rotation of the shaft 35 is effected by a reversible power actuator 37 such as the illustrated piston 38 and cylinder 39. As shown in FIG. 1, a toothed rack 40 is mounted on the free end of the piston rod 41 and guided for movement along a path extending normal to the shaft 35, which rack meshes with a pinion 42 on the shaft 35. When pressure fluid is admitted selectively to either the rod or head end of the cylinder 39, the piston rod 41 and the rack 40 carried thereby is driven back and forth relative to the pinion 42 thereby to rotate the pinion and the shaft 35.

As mentioned above, the glass sheets are shaped by being pressed between the complemental shaping surfaces 25 formed on the male and female mold parts. To this end, the mold parts 23 and 24 are mounted to move relative to each other between an open position, wherein the mold parts are spaced apart with one of the parts above the conveyor and the other part below the conveyor, to a closed position wherein the shaping surfaces 25 on the mold parts are in close proximity and operable to press a glass sheet therebetween. While either or both mold parts may be moved in the bending operation, in the present instance, the upper mold part 23 remains substantially stationary and the lower mold part 24 reciprocates back and forth in a vertical plane toward and away from the upper mold part. In this manner, as a heated sheet 12 is carried by the conveyor 19 into the bending area B and between the mold parts, it is raised by the lower mold part 24 into pressing engagement with the upper mold part 23 to form the sheet to the desired shape after which it is returned to the conveyor and moved into the cooling area C.

In the illustrated embodiment, the lower mold part 24 is an open ring-type structure having shaping surfaces 25 which engage only the marginal edge portions of the sheets thereby to avoid marring the portions of the undersurface of the sheet which lie within the viewing area of the finished window. To this end, the lower mold part is formed by bars 43 arranged in a substantially rectangular configuration and having shaping surfaces 25 formed on their upwardly directed faces, which surfaces conform in outline and curvature to the glass sheets when bent.

In the bending sequence, when the lower mold part engages the undersurfaces of the sheets, which are then at the elevated bending temperature, the relatively cool bars 43 absorb heat from the contacted areas of the sheet. If the rate of heat absorption is comparatively high, as would ordinarily be the case, it adversely affects the glass causing chill cracks or other imperfections in the contact areas of the sheet. To avoid this difficulty, heat absorption by the bars is retarded by providing a heat resistant and insulating covering 44 on the bars, which covering prevents rapid transfer of heat from the sheets to the bars. The bars 43 are carried on a base 45 disposed below the plane of the conveyor 19 by upright posts 46 extending between the base and the bars between adjacent rolls of the conveyor. The base 45 rests on a carriage 47 which supports the lower mold part 24 for movement toward and away from the upper mold part and is secured to the carriage as by bolts 48.

Raising and lowering of the lower mold part 23 toward and away from the upper mold part 24 is accomplished through the medium of a suitable actuating mechanism 49 coupled to the carriage 47 supporting the mold part. While many different actuating mechanisms could be employed to impart the desired reciprocal motion to the lower mold part, in the illustrated embodiment a simple cam and follower is employed. More specifically, a cam follower 50 operatively coupled to the carriage 47 rides on the outer periphery of a disk cam 51 shaped in the usual manner to impart the desired sequence of motion to the follower and thus to the carriage.

Herein, two actuating mechanisms are provided, one on each side of the path, but, since the mechanisms are identical in construction, a detailed description of one will suffice to disclose their structure.

The disk cam 51 is fast on a rotatable shaft (not shown) underlying the lower mold part and extending transversely of the path beneath the conveyor. The shaft is coupled to a drive means (not shown) operable to rotate the shaft and the cam 51 carried thereby about a fixed horizontal axis.

As the cam 51 is rotated, the follower 50 rides along the developed irregular outline of the outer periphery of the cam and thereby is reciprocated along a substantially vertical axis toward and away from the axis of the shaft. The follower 50 is coupled to the carriage 47 so as to transmit the reciprocal motion, imparted to the follower by the cam, to the lower mold part. For this purpose, the follower 50 is mounted on a bar 52 depending from the carriage 47 toward the cam 51 with the upper end of the bar being secured to the carriage. The follower 50 comprises a roller 53 journaled on one end of an arm 54 secured at its opposite end to the bar 52 intermediate the ends thereof and inclined downwardly toward the cam so that the roller rests on the edge of the cam and thus supports the lower mold part 24.

In order to guide the movements of the lower mold part 24, the bar 52 is coupled to the framework 26 of the bending means 14 by links which, together with the frame and the bar, comprise a four bar linkage 55 in which the links are arranged in a parallelogram. As best shown in FIG. 1, the bar 52 and one of the vertical columns 27 form one pair of parallel links in the linkage 75. The other pair of parallel links comprise two elongated members 56 extending between the bar 52 and the framework 26 and each having one of their ends journaled to the bar at spaced points therealong and their opposite ends attached to parallel shafts 57 extending between the transversely aligned columns 27 with their opposite ends journaled in bearings 58 mounted on the columns to rock about parallel, fixed, substantially horizontal axes. Since with this type of linkage the links of each pair remain parallel to each other at all times, the bar 52 remains parallel to the vertical columns 27 throughout its endwise movements.

It will be apparent that the bar 52 does not move in a straight line but rather follows a slightly arcuate path as it is raised and lowered by the actuating mechanism. Initial adjustment, however, may insure that, in the uppermost position of the lower mold part 24, the shaping surfaces 26 on the mold parts are in proper registry.

As noted above, the bending sequence, that is, the raising and lowering of the lower mold part, is initiated each time a heated sheet enters the bending area B and its presence is sensed by a sensing device. To this end, the drive means (not shown) for the actuating mechanism 49 operates in response to signals from the sensing device to rotate the cam 51 thereby to move the carriage 47 and the lower mold part 24 carried thereby through a single raising and lowering cycle. Rotation of the cam 51 raises the lower mold part to lift the sheet 12 off the conveyor 19 and carry it into pressing engagement with the upper mold part 23 thereby to form the heated sheet to the curvature defined by the shaping surfaces 25, after which, the mold part is lowered to deposit the bent sheet on the conveyor which moves it into the chilling area C.

Since, as described above, the shaping surfaces 25 of lower mold part 24 engage only the marginal portions of the sheets, to insure that the inner areas of the sheets will be formed precisely to the desired curvature, the upper mold part is provided with a continuous shaping surface adapted to engage the entire upper surface of the sheets. This, of course, means that the surfaces of the sheets lying within viewing areas of the finished window are contacted by the shaping surface of the upper mold part, and since the glass is in a heat-softened condition when so contacted, there is a tendency for the sheets to become marred or otherwise damaged and for any surface imperfections on the mold part to become impressed into the surface of the glass sheet.

To reduce the tendency for the sheets to become marred as the result of being forced into contact with the mold during the pressing operation, the present invention contemplates creating a cushion of air between the sheets and the shaping surface on the upper mold part. The air cushion prevents direct contact, or, at least, lessens the force of contact, between the upper surface of the sheet and the shaping surface on the mold so that the somewhat soft surface of the sheet is not dented, scuffed or otherwise marred by the shaping surface.

In another of its aspects, the invention contemplates directing a blast of air through the shaping surface and against the glass sheets after the sheet has been pressed into the desired curvature and as the lower mold part begins its downward movement away from the upper mold part. In this connection, it has been found, particularly when bending spherical curves, that the sheets tend to cling to the upper mold part and the use of the blasts of air insures that the sheets properly clear the shaping surface of the upper mold part and rest on the lower mold part as the latter moves downwardly after the bending is completed.

The foregoing is accomplished, in accordance with the invention, by blowing air downwardly through the shaping surface 25 on the upper mold part 23 and against the upper surface of the sheet resting on the lower mold part. For this purpose, an air chamber is provided behind the shaping surface, which chamber is coupled to a source of pressurized air, and the shaping surface is provided with a plurality of orifices through which the air flows from the chamber and outwardly of the shaping surface.

In the present instance, the upper mold part 23 comprises a cup-shaped structure 59 having a generally horizontally disposed end wall 60 and upstanding, substantially vertical side walls 61 formed integrally with the end wall. A male or generally convex shaping surface is formed on the outer or downwardly directed face of the end wall. As with the lower mold part, the outline shape of the upper mold part is dictated by the outline of the glass sheets to be bent.

Adjacent the open end of the structure 59, an inwardly projecting rib 62 is formed integral with the inner surface of the side walls 61. The rib 62 is adjacent to but spaced downwardly from the upper edge of the end walls 61 to provide a shoulder 63 on which is seated a plate 64 which closes the open end of the cup-shaped structure and provides a sealed air chamber. The plate 64 is secured to the rib 62 by machine screws 65 passing through the plate and threaded into the rib. The air chamber is coupled to a source of air under pressure (not shown) by a pipe 66 threaded into a tapped bore formed in a boss 67 provided near the center of the plate. The air flows from the chamber through orifices 68 in the end wall which terminate at the shaping surface and communicate with the air chamber. The orifices 68 may take the form of spaced holes bored or otherwise formed in the end wall 60.

Figure 3:
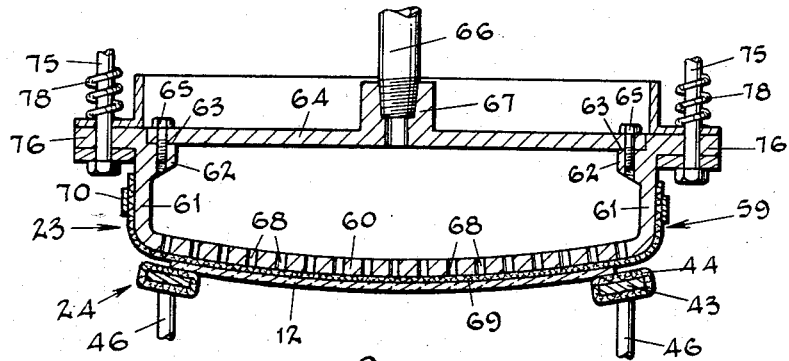
FIG. 3 is a fragmentary sectional view taken along line 3—3 in FIG. 2.

When the flow of air through the shaping surface of the upper mold part is utilized only to insure that the sheets properly clear the mold after being bent, the supply of air to the sealed chamber may be controlled by suitable means (not shown) to provide intermittent blasts of air directed against the glass sheet. In this regard, it will be appreciated that the blast of air to force the bent sheet away from the shaping surface on the upper mold part and against the shaping surface on the lower mold part may be initiated immediately after the pressing phase of the bending sequence and as the lower mold part begins its downward movement to return the bent sheet to the conveyor and may be interrupted immediately after the sheet clears the shaping surface. To accomplish this intended purpose, the air may be directed through a single orifice or through a plurality of orifices such as illustrated in FIG. 3.

To aid in preventing marring of the sheet, the shaping surface 25 formed on the downwardly directed face of the end wall 60 is covered with a comparatively soft, non-abrasive heat resistant material 69 such as asbestos, glass cloth or the like. The covering 69 extends completely across the shaping surface 25 and upwardly along the outer surface of the side walls 61 where it is clamped to the mold part by a band 70 encircling the side walls.

As shown in FIG. 1, the upper mold part 23 is supported above the plane of the conveyor 19 on a mounting frame 71 carried by beams 72 extending longitudinally along the path and fixed at their opposite ends to the beams 28 of the framework 26. In order to permit alignment of the mounting frame 71 with the conveyor 19, the frame is attached to the beams 72 by adjustable means such as rods 73 having their opposite ends threaded into tapped blocks 74 secured to the beams and to the frame.

The upper mold part 23 is supported on the mounting frame 71 by means of bolts 75 passing through a flange 76 formed integrally with and projecting laterally outwardly from the upper mold part and through an opposed flange 77 on the mounting frame. The mold part 23 is held in spaced relation to the mounting frame 71 by resilient means such as coil springs 78 telescoped on the bolts and acting between the opposed surfaces of the flanges 76 and 77. The coil springs 78 serve to permit yielding of the upper mold part to prevent excessive pressure being exerted on the glass sheets as the lower mold part is moved into pressing engagement therewith. In addition, by tightening or loosening the bolts 75, thereby compressing or relieving the springs 78, the plane of the mold part may be adjusted relative to the plane of the conveyor 19.

It will be appreciated that the present invention permits bending glass sheets to closely defined curvatures by a continuous process conducive to mass production techniques while, at the same time, insuring that the surfaces of the finished bent sheets will be smooth and in no way impaired by the bending procedure.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. In a method of bending glass sheets, the steps of heating a sheet to be bent to an elevated bending temperature, supporting said heated sheet in a substantially horizontal plane between upper and lower mold parts disposed above and below said horizontal plane and having opposed complemental shaping surfaces formed thereon, moving said lower mold part toward said upper mold part thereby to lift said glass sheet from said plane and carry the sheet into pressing engagement with said shaping surface on said upper mold part and thereafter lowering said lower mold part to return said sheet to said plane, and directing a blast of air under pressure through said shaping surface on said upper mold part while said sheet is in engagement therewith and as said lower mold part begins its downward movement thereby to urge said sheet away from said shaping surface on said upper mold part and against said lower mold part.

2. In apparatus for bending glass sheets, the combination of, means supporting a glass sheet to be bent in a substantially horizontal plane, an upper mold part supported above said plane and having a substantially horizontally disposed wall, a shaping surface formed on a downwardly directed face of said wall, an open ring type lower mold part having an opposed complemental shaping surface formed thereon engageable with the marginal edge portions only of the sheet, means supporting said lower mold part for vertical movement toward and away from said upper mold part, means defining a sealed air chamber adjacent the upper face of said wall, said wall having a plurality of orifices formed therethrough and communicating with said air chamber, and means supplying air under pressure to said air chamber as the sheet is pressed between said shaping surfaces on said upper and lower mold parts.

3. In apparatus for bending glass sheets as defined in claim 2, in which said means defining said air chamber comprises side walls integral with and upstanding from said wall to form a cup-shaped structure and a plate secured to said side walls above said wall.

4. In apparatus for bending glass sheets, the combination of, means for supporting a glass sheet in a substantially horizontal plane, a first mold part mounted above said plane and having a downwardly directed substantially continuous shaping surface conforming in curvature to the glass sheet when bent, a second mold part having a complemental shaping surface formed thereon, means supporting said second mold part for movement relative to said first mold part between a first position disposed below said plane to a second position above said plane and in close proximity to said first mold part thereby to lift a glass sheet supported in said plane and carry the sheet into pressing engagement with said upper mold part and to subsequently return the sheet to said horizontal plane, means for directing air outwardly through said substantially continuous shaping surface on said upper mold part to impinge on the upper surface of said glass sheet thereby to form a cushion of air between said shaping surface and said sheet as the latter is carried into pressing engagement therewith by said lower mold part.

References Cited

UNITED STATES PATENTS

| 2,251,159 | 7/1941 | Owen | 65—273 X |
| 2,395,727 | 2/1946 | Devol | 65—157 |
| 2,570,309 | 10/1951 | Black | 65—273 X |

HOWARD R. CAINE, *Acting Primary Examiner.*

S. LEON BASHORE, DONALL H. SYLVESTER, *Examiners.*

A. D. KELLOGG, *Assistant Examiner.*